United States Patent
Kulchytskyy

(10) Patent No.: US 10,296,643 B2
(45) Date of Patent: May 21, 2019

(54) MOBILE BACKGROUND LISTENER INFLUENCED SEARCH RESULTS PRIORITIZATION

(71) Applicant: SugarCRM Inc., Cupertino, CA (US)

(72) Inventor: Vladyslav Kulchytskyy, Nashua, NH (US)

(73) Assignee: SUGARCRM INC., Cupertino, CA (US)

( * ) Notice: Subject to any disclaimer, the term of this patent is extended or adjusted under 35 U.S.C. 154(b) by 428 days.

(21) Appl. No.: 14/993,260

(22) Filed: Jan. 12, 2016

(65) Prior Publication Data

US 2017/0199935 A1    Jul. 13, 2017

(51) Int. Cl.
G06F 17/30 (2006.01)
G06F 17/24 (2006.01)
G06F 17/28 (2006.01)

(52) U.S. Cl.
CPC ...... *G06F 17/30864* (2013.01); *G06F 17/243* (2013.01); *G06F 17/28* (2013.01); *G06F 17/30554* (2013.01)

(58) Field of Classification Search
CPC ......... G06F 17/30864; G06F 17/30554; G06F 17/243
See application file for complete search history.

(56) References Cited

U.S. PATENT DOCUMENTS

2006/0293065 A1* 12/2006 Chew ............... G06Q 30/02
455/456.3
2010/0318551 A1* 12/2010 Lai ............... G06F 17/30699
707/765

\* cited by examiner

*Primary Examiner* — Loc Tran
(74) *Attorney, Agent, or Firm* — Steven M. Greenberg, Esq.; Shutts & Bowen LLP

(57) ABSTRACT

Embodiments of the invention provide a method, system and computer program product for mobile background listener influenced search result prioritization. In an embodiment of the invention, the method includes capturing data in memory of a mobile computing device and caching the captured data as terms in a temporary data store of the mobile computing device. The method also includes receiving one or more query terms in a query interface displayed in a display of the mobile computing device and directing a search engine to search a repository of data based upon the query terms and receiving, in response, a list of search results. The method yet further includes identifying ones of the search results as having a correlation to one or more terms in the temporary data store. Finally, the method includes presenting the ones of the search results first in the display relative to others of the search results.

9 Claims, 1 Drawing Sheet

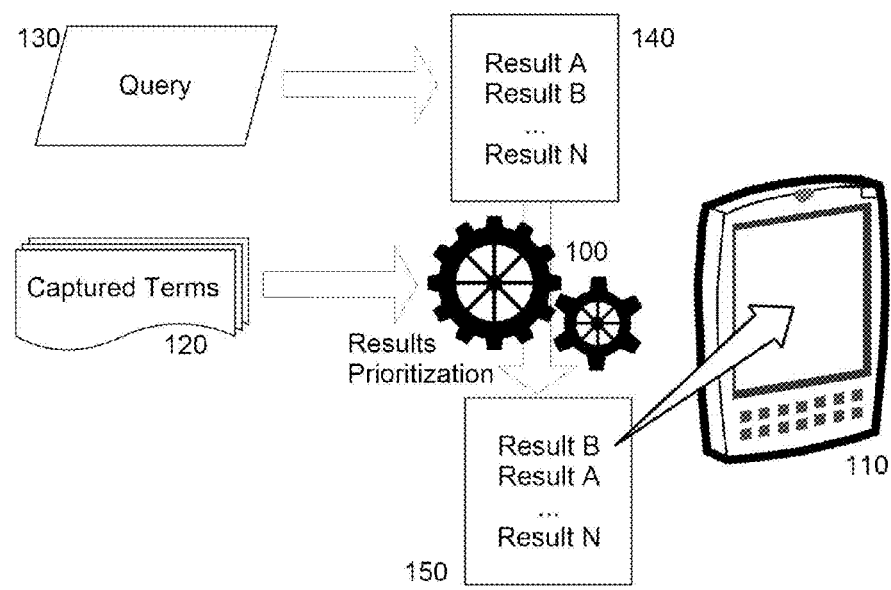
FIG. 1
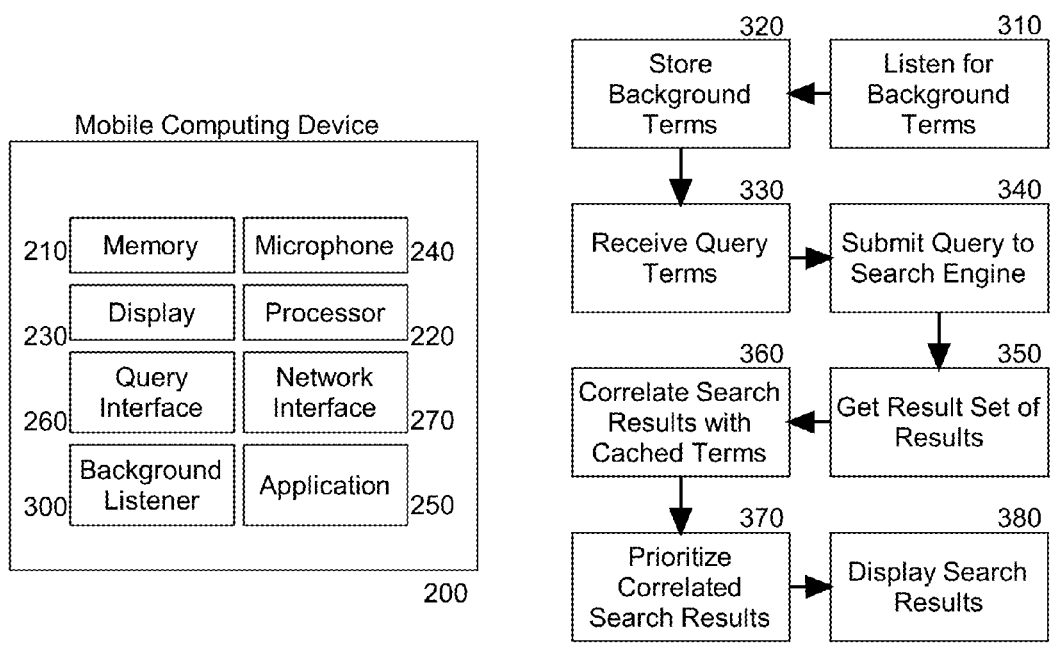
FIG. 2
FIG. 3

MOBILE BACKGROUND LISTENER INFLUENCED SEARCH RESULTS PRIORITIZATION

BACKGROUND OF THE INVENTION

Field of the Invention

The present invention relates to search results processing and more particularly to search results prioritization in a search engine.

Description of the Related Art

Content browsing refers to the retrieval and presentation of electronic content in a browser client. Content generally can include database records, electronic documents, messages, audio, audiovisual and video materials and imagery. Most commonly, content can be stored in a server environment and published for access by content consumers over a computer communications network such as the global Internet. Likewise, content can be stored in a database server environment and accessed through a query interface such as where the content is part of a data driven application. In either circumstance, content consumers generally retrieve content over the network by reference to one or more content identifying terms, or by reference to a network address for the content. Once retrieved, the content can be presented in a user interface.

Given the vast amount of content published for accessibility in a typical content distribution environment, one cannot enjoy an awareness of all possible content a priori so as to specify with particularity content of interest. Search engines fill the gap by providing an interface through which end users can instruct searches for content according to one or more search terms. Basic search engines permit simple term searches where the presence of one or more search terms in content result in the return of a reference to the located content. More sophisticated search engines permit boolean searching and even more sophisticated search engines allow for natural language searching.

Where search terms are provided in a search engine, the results are often presented dynamically as the end user keys in the different letters of one or more search terms and the dynamically produced results often reflect the relevance of a "hit" based upon a percentage of search terms present in the located content. Yet, in many cases, the search terms provided are not intended to be located in desired content. Rather, search engines frequently permit one to require the omission of any content containing a search term. In boolean terms, the NOT operation is permitted as well as the AND and OR operations. In any event, where the result list from a search is large, the returned document of greatest interest may be obscured from apparent view by the end user. Accordingly, prioritizing a list of search results to render first those search results of utmost interest can be of paramount importance.

Current methods for prioritizing the display of search results in a list of search results include providing advantage to documents which are more relevant to the query, documents which are updated recently, documents which are linked to by other documents often, and documents which are often selected in other similar searches. Some search engines do include the most recent content from particular feeds (like recent "Twitter(TM)" entries, related to a given query. While these methods go a long way in presenting the user desired content in most efficient form, these methods still leave a lot to be desired.

BRIEF SUMMARY OF THE INVENTION

Embodiments of the present invention address deficiencies of the art in respect to search results processing and provide a novel and non-obvious method, system and computer program product for mobile background listener influenced search result prioritization. In an embodiment of the invention, data is captured in memory of a mobile computing device and cached as terms in a temporary data store of the mobile computing device. Thereafter, one or more query terms are received in a query interface displayed in a display of the mobile computing device and a search engine is directed to search a repository of data based upon the query terms. In response to the search engine searching the repository of data, a list of search results is received. Consequently, ones of the search results are identified as having a correlation to one or more terms in the temporary data store and the identified ones of the search results are presented first in the display relative to others of the search results.

In one aspect of the embodiment, the captured data is speech recognized audio, whereas in another aspect of the embodiment, the captured data is text input in a text input field of a user interface to an application executing in the mobile computing device. In yet another aspect of the invention, the ones of the search results identified as having a correlation to the one or more terms in the temporary data store are ones of the search results sharing a threshold number of characters with the one or more terms in the temporary data store.

In another embodiment of the invention, a data processing system is configured for mobile background listener influenced search result prioritization. The system includes a mobile computing device that has memory, a display and at least one processor. The system also includes a query interface presented in the display. The query interface provides a text input field receiving one or more query terms querying an application executing in the memory of the mobile computing device and receiving in response, search results. The system yet further includes a search results prioritization module coupled to the query interface. The module includes program code enabled to capture data in the memory of the mobile computing device and cache the captured data as terms in a temporary data store of the mobile computing device, identify ones of the search results having a correlation to one or more terms in the temporary data store, and present the ones of the search results first in the query interface of the display relative to others of the search results.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for mobile background listener influenced search result prioritization;

FIG. 2 is a schematic illustration of a data processing system configured for mobile background listener influenced search result prioritization; and, FIG. 3 is a flow chart illustrating a process for mobile background listener influenced search result prioritization.

DETAILED DESCRIPTION OF THE INVENTION

Embodiments of the invention provide for mobile background listener influenced search result prioritization. In accordance with an embodiment of the invention, a passive listener is deployed on a mobile computing device such that the passive listener captures terms in real time and caches the captured terms in a temporary data store. Thereafter, a query interface is presented in a display of the mobile computing device through which one or more query terms are presented as input to a search engine. In response to the query terms, a result set is retrieved into memory of the mobile computing device, but results determined to be closely related to cached terms in the temporary data store are presented in the display of the mobile computing device first in priority in the result set as compared to other results in the result set. In this way, the result set is biased in respect to contemporaneously captured data in the mobile computing device.

In further illustration, FIG. 1 pictorially shows a process for mobile background listener influenced search result prioritization. As shown in FIG. 1, results prioritization logic 100 captures terms 120 in real time in mobile computing device 110, such as audible recordings in proximity to the mobile computing device 110, or through data input presented in mobile computing device 110. The results prioritization logic 100 then receives a query 130 which when processed produces a result set 140. The content of the result set 140 is then compared by results prioritization logic 100 to the captured terms 120 in order to detect one or more correlations between one or more results in the result set 140 and one or more of the captured terms 120. Thereafter, results prioritization logic re-orders the results set 140 to produce a prioritized result set 150 emphasizing the results in the result set 140 that correlate to the captured terms 120. Finally, the prioritized result set 150 is displayed in the mobile computing device 110.

The process described in connection with FIG. 1 is implemented in a data processing system. In yet further illustration, FIG. 2 schematically shows a data processing system configured for mobile background listener influenced search result prioritization. As shown in FIG. 2, the data processing system includes a mobile computing device 200. The mobile computing device 200 includes memory 210, at least one processor 220 and a display 230. The mobile computing device 200 further includes a microphone 240 through which audio is recorded in the memory 210.

The mobile computing device 200 supports the operation of a mobile application 250. The mobile application 250 is enabled to interact with a remote computer program over a computer communications network by way of network interface 270. In particular, a query interface 260 is coupled to the application 250 and is configured to receive one or more query terms which which a search engine is directed to conduct a search for data in respect to the application 250 for the query terms. In response to the search, a result set is received in the query interface 260 including results pertinent to the query terms.

Of note, a background listener module 300 is coupled to the query interface 260. The background listener module 300 includes program code that when executed by the processor 220 is enabled to speech recognize audio received through the microphone 240 into captured textual terms which are then stored in the memory 210. The background listener module 300 additionally includes program code that when executed by the processor 220 is enabled to compare the captured textual terms in the memory 210 to the terms of the result set produced in response to the search. Finally, the program code of the background listener module 300 is enabled to prioritize results in the result set that most closely correlate to the captured textual terms.

In even yet further illustration of the operation of the background listener 300, FIG. 3 is a flow chart illustrating a process for mobile background listener influenced search result prioritization. Beginning in block 310, the background listener listens for background terms for capture—for instance by speech recognizing audio transduced by a microphone of the mobile computing device, or by monitoring keyword input in input fields of an application executing in the mobile computing device. In block 320, the terms captured by the background listener are cached in the memory of the mobile computing device.

In block 330, one or more query terms are received in a query interface in the mobile computing device and in block 340 the query terms are submitted to a search engine. In response to the submission of the query terms to the search engine, a result set of results is returned in block 350 and in block 360, the words of each result of the result set are correlated to the captured terms. In block 370, results in the result set most closely correlated to the captured terms—for instance those results having a threshold number of characters in common with a captured term amongst the captured terms—are prioritized for display in the result set. Finally, in block 380 the prioritized result set is displayed in the mobile computing device.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for mobile background listener influenced search result prioritization, the method comprising:
   automatically passively capturing data in memory of a mobile computing device from a source in the mobile computing device wherein the data is automatically and passively captured by speech recognized audio while an end user enters data in a plurality of different applications executing in the mobile computing device and the data is automatically and passively captured by speech recognized audio while the end user is in proximity to the mobile computing device without the end user entering data in one of the plurality of applications executing in the mobile device;
   caching the passively captured data as different passively captured terms in a temporary data store of the mobile computing device;
   by user input, receiving one or more query terms in a query interface displayed in a display of the mobile computing device;
   directing a search engine to search a repository of data based upon the user input query terms and receiving, in response, a list of search results;
   automatically identifying ones of the search results as having a correlation to one or more of the passively captured terms in the temporary data store; and presenting the ones of the search results first in the display relative to others of the search results.

2. The method of claim 1, wherein the captured data while the end user enters data in the plurality of applications of the mobile computing device is text input in a text input field of a user interface to one of the plurality of applications executing in the mobile computing device.

3. The method of claim 1, wherein the ones of the search results identified as having a correlation to the one or more terms in the temporary data store are ones of the search results sharing a threshold number of characters with the one or more terms in the temporary data store.

4. A data processing system configured for mobile background listener influenced search result prioritization, the system comprising:
   a mobile computing device comprising memory, a display and at least one processor;
   a query interface presented in the display, the query interface providing a text input field receiving one or more query terms, by user input, querying an application executing in the memory of the mobile computing device and receiving in response, search results; and
   a search results prioritization module coupled to the query interface, the module comprising program code enabled to automatically passively capture data in the memory of the mobile computing device from a source in the mobile computing device wherein the data is automatically and passively captured by speech recognized audio while an end user enters data in a plurality of different applications executing in the mobile computing device and the data is automatically and passively captured by speech recognized audio while the end user is in proximity to the mobile computing device without the end user entering data in one of the plurality of applications executing in the mobile device, cache the passively captured data as passively captured terms in a temporary data store of the mobile computing device, to automatically identify ones of the search results having a correlation to one or more of the passively captured terms in the temporary data store, and present the ones of the search results first in the query interface of the display relative to others of the search results.

5. The system of claim 4, wherein the captured data while the end user enters data in the plurality of applications of the mobile computing device is text input in a text input field of a user interface to one of the plurality of applications executing in the mobile computing device.

6. The system of claim 4, wherein the ones of the search results identified as having a correlation to the one or more terms in the temporary data store are ones of the search results sharing a threshold number of characters with the one or more terms in the temporary data store.

7. A computer program product for mobile background listener influenced search result prioritization, the computer program product comprising a non-transitory computer readable storage medium having program instructions embodied therewith, the program instructions executable by a device to cause the device to perform a method comprising:

automatically passively capturing data in memory of a mobile computing device from a source in the mobile computing device wherein the data is automatically and passively captured by speech recognized audio while an end user enters data in a plurality of different applications executing in the mobile computing device and the data is automatically and passively captured by speech recognized audio while the end user is in proximity to the mobile computing device without the end user entering data in one of the plurality of applications executing in the mobile device;

caching the passively captured data as different passively captured terms in a temporary data store of the mobile computing device;

by user input, receiving one or more query terms in a query interface displayed in a display of the mobile computing device;

directing a search engine to search a repository of data based upon the user input query terms and receiving, in response, a list of search results;

automatically identifying ones of the search results as having a correlation to one or more of the passively captured terms in the temporary data store; and presenting the ones of the search results first in the display relative to others of the search results.

8. The computer program product of claim 7, wherein the captured data while the end user enters data in the plurality of applications of the mobile computing device is text input in a text input field of a user interface to one of the plurality of applications executing in the mobile computing device.

9. The computer program product of claim 7, wherein the ones of the search results identified as having a correlation to the one or more terms in the temporary data store are ones of the search results sharing a threshold number of characters with the one or more terms in the temporary data store.

* * * * *